(12) United States Patent
Kato et al.

(10) Patent No.: US 6,781,802 B2
(45) Date of Patent: Aug. 24, 2004

(54) CONTROLLING DEVICE OF COMPRESSOR

(75) Inventors: Hideaki Kato, Tochigi-ken (JP); Tetsuo Nomoto, Gunma-ken (JP); Yuichi Izawa, Gunma-ken (JP); Takahisa Matsuo, Gunma-ken (JP); Yasuhiro Makino, Saitama-ken (JP); Kazuhisa Otagaki, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/065,090

(22) Filed: Sep. 16, 2002

(65) Prior Publication Data

US 2003/0079486 A1 May 1, 2003

(30) Foreign Application Priority Data

Oct. 30, 2001 (JP) .................................... 2001-333038

(51) Int. Cl.[7] ................................................. H02H 7/00
(52) U.S. Cl. ...................................................... 361/22
(58) Field of Search ........................... 361/22; 318/254, 318/439, 134

(56) References Cited

U.S. PATENT DOCUMENTS

| 3,946,738 | A | * | 3/1976 | Newton et al. | ............... | 606/34 |
| 4,155,852 | A | * | 5/1979 | Fischel et al. | .............. | 210/186 |
| 4,833,377 | A | * | 5/1989 | Volk et al. | .................. | 318/747 |
| 6,169,378 | B1 | * | 1/2001 | Karwath | ..................... | 318/254 |
| 6,611,441 | B2 | * | 8/2003 | Kurokami et al. | ....... | 363/56.02 |
| 6,636,107 | B2 | * | 10/2003 | Pelly | .......................... | 327/552 |

FOREIGN PATENT DOCUMENTS

JP 11146557 * 5/1999 ............ H02H/9/08

OTHER PUBLICATIONS

Ogasawara et al., Modeling and Damping of High Frequency Leakage Currents in PWM Inverter–Fed AC Motor Drive, IEEE Transactions on Industrial Applications, vol. 32, No. 5, 1996, pp. 1105–1114.*

* cited by examiner

Primary Examiner—Brian Sircus
Assistant Examiner—Z Kitov
(74) Attorney, Agent, or Firm—J.C. Patents

(57) ABSTRACT

A controlling device of a compressor is provided. A noise filter is arranged at an input of the inverter circuit that converts the commercial frequency to a driving frequency to control a motor driving a compressor mechanism, for suppressing a common mode noise of the commercial power source and the inverter circuit, and is connected to a ground through a metal frame used for receiving a compressor main body. The noise filter comprises coils connected between first capacitors and second capacitors that are connected in series between the AC power lines, and further comprises a clamper connected between nodes of the second capacitors and the metal frame for clamping a voltage and a third capacitor connected to the clamper in parallel. even though the new refrigerant, such as R410A, and the three-phase AC power source are used, the leakage current can be reduced by a simple structure and the increase of the noise terminal voltage can be also suppressed. Furthermore, both of the legal regulation requirements can be met.

7 Claims, 11 Drawing Sheets

CONTROLLING DEVICE OF COMPRESSOR

CROSS REFERENCE TO RELATED APPLICATIONS

This application claims the priority benefit of Japanese application serial no. 2001-333038, filed on Oct. 30, 2001.

BACKGROUND OF INVENTION

1. Field of the Invention

This invention relates in general to a controlling device of a compressor. A common mode noise (ground noise), which is generated inside a metal frame (the controlling device of a compressor) of an air conditioner etc for containing a compressor main body, suppresses the leakage current flowing from the frame to the ground by using the electrostatic (floating) capacitance between the compressor main body and the ground. In addition, the noise (namely, the noise terminal voltage) from the controlling device to the commercial AC power source through the power lines can be also suppressed.

2. Description of Related Art

Compressor used in the air conditioner etc, consists of a compressor mechanism, a DC brushless motor for providing a driving force to the compressor mechanism, and various protecting devices. Most of these devices are received in a compressor main body (namely, a metal case). The compressor executes a refrigerant compressing cycle, in which the compressor mechanism receives a driving force from the motor for compressing the refrigerant into the compressor main body, and then after the refrigerant is compressed and processed under high temperature and pressure, the refrigerant is exhausted out of the compressor main body. The refrigerant pipes that are connected to the compressor, the condenser or evaporator, etc, form a refrigerant loop of the air conditioner or the refrigerator, which is equivalent to a refrigerant cycling pump for heating or cooling the ambit air of the condenser or evaporator. In addition, recently, the limited use of the refrigerant (such as R-22, the old refrigerant, hereinafter) due to a concern of causing an ozone hole problem is actively replaced by a refrigerant (such as HFC containing R407 or R410A, the new refrigerant, hereinafter) that has no influence on the above said problem.

Examples of some of the compressors used are, a reciprocating compressor, a rotary compressor, and a scroll compressor. Recently, the rotary compressor or the scroll compressor has become the main product. In the compressor, because the compressed refrigerant is exhausted into the compressor main body (namely, the metal case), the refrigerant is exposed to the ambit air inside the case. Then, the high temperature and pressure, the refrigerant is exhausted out of the compressor main body through the refrigerant pipes (especially, the exhausting pipe) fixed on the case. The refrigerant cycling loop located behind the compressor is a general structure. In operation, because the interior of the compressor main body (the metal case) is filled with the compressed high-pressure refrigerant, the metal case is usually sealed.

As described, the motor in the sealed metal case can be a DC motor or an AC motor. In consideration of designing a compressor featuring a noise-free operation, easy controllability, and the compactness, an inverter driven DC motor is used. In addition, since the compressor main body is a sealed metal case, therefore it is preferable to use a brushless motor that is free from fixing or maintenance concerns. Recently, the DC brushless motor is most widely used.

FIG. 9 shows an example of a controlling device of a compressor having a driving circuit to drive an inverter driven DC brushless motor. The controlling device comprises a three-phase AC power source 1, a driving circuit 2 for inverter driving a DC brushless motor, a compressor main body (i.e., a metal case) 9, and a metal frame 10 forming a main body of an air conditioner for receiving the condenser, the fan and various controlling circuits (not shown). Metal pipes (not shown) are fixed on the compressor main body 9 by welding.

The driving circuit 2 has a main circuit consisting of a first noise filter 3 for decreasing (suppressing) a noise created by the machine itself and the ground noise (the common mode noise), created between power lines and the metal frame 10 or the ground, a rectifying diode bridge 4 for rectifying the three-phase AC power source to a DC power source, a second noise filter 6, a rectifying capacitor 7 and a three-phase inverter circuit 8.

The rectifying diode bridge 4, the second noise filter 6 and the rectifier capacitor 7 smoothly converts an AC voltage to a DC voltage. In addition, the three-phase inverter circuit 8 switches the DC voltage from the rectifying capacitor 7 by a preset frequency (the switching frequency can be 5 kHz, for example), and then provides a driving power to the DC brushless motor. Furthermore, the compressor main body 9 and the metal frame 10 are respectively connected to the nodes among the second capacitors Cy1, Cy2, Cy3 that are connected in series between the power lines of the three-phase AC power 1. In addition, in view of a stable operation of the driving circuit 2 and safety for preventing the human body from the electric shock due to the possibility of touching the frame 10, the compressor main body 9 and the metal frame 10 are grounded.

However, in the above situation, as the intermittent DC voltage, which is switched by the three-phase inverter circuit 8 with a high speed, is provided to the DC brushless motor, a DC current flows, and the power lines in the metal case 9 or the wirings (for specified, the wirings of the stator of the DC brushless motor) will have a coupling capacitance with the metal case 9 through the refrigerant sealed inside the compressor. In contrast to the old refrigerant, the coupling capacitance (the floating capacitance) created between the power lines and the case 9 through the new refrigerant, for example R410A, is larger. This is because the new refrigerant has a low resistance and a high dielectric constant with respect to the old refrigerant. Due to the influence of the resistance and the dielectric constant of the new refrigerant, the coupling capacitance becomes larger.

There are legal regulations for appliances to regulate the leakage current. In the appliance regulation, the regulation value for a leakage current should be below 1 mA. In particular, in the driving circuit 2 shown in FIG. 9, when the old refrigerant is replaced by the new refrigerant, the resulting leakage current is difficult to meet the regulation requirement (below 1 mA).

Consequently, there is a need to develop a leakage current suppressing circuit. One such circuit has been disclosed by a Japanese Laid Open publication number 11-146557 which uses a single-phase AC power source. However, when the three-phase AC power source shown in FIG. 9 is used, the leakage current is definitely larger than that disclosed by the above disclosure, which describes using a single-phase AC power source. In recent years, the controlling device of the compressor, in which the economic factors were priorly considered, becomes more difficult to meet the requirement of the legal regulation values.

On the other hand, no matter what method is used in order to meet the legal regulation requirement for the leakage current, the noise terminal voltage, which shows the characteristic of the noise of the machine itself to powerlines, will increase. Therefore, the margin to meet the legal regulation requirement of the noise terminal voltage might become small. In the appliance regulation, the regulation value of the noise terminal voltage is below 56 dB at a frequency range from 526.5 kHz to 5 MHz, and is below 60 dB at a frequency range from 5 MHz to 30 MHz.

SUMMARY OF INVENTION

In the light of the foregoing description, an object of this invention is to provide a controlling device of a compressor. For example, even though the new refrigerant, such as R410A, and the three-phase AC power source are used, the leakage current can be reduced by a simple controlling device structure and the increase of the noise terminal voltage can be also suppressed at the same time. Furthermore, both of the legal regulation requirements can be met.

In order to achieve the above objects, this invention provides a controlling device of a compressor, which comprises a commercial power source; a motor, for driving a compressor mechanism; an inverter circuit, for converting a commercial frequency to a driving frequency, to control the motor; a noise filter, arranged at an input of the inverter circuit, for suppressing a common mode noise of the commercial power source and the inverter circuit, and connected to a ground through a metal frame used for receiving a compressor main body, wherein the noise filter further comprises first capacitors, second capacitors and common mode reactor coils; and a leakage current suppressing circuit, having a clamper for clamping a voltage, and connected between nodes of the second capacitors and the metal frame. In the noise filter, one end of each second capacitor is connected to the AC power line through the corresponding common mode reactor coil, and the other end of the each second capacitor is connected to the leakage current suppressing circuit, and each of the first capacitors is connected between two of the AC power lines.

The invention further provides a controlling device of a compressor comprising a commercial power source; a motor, for driving a compressor mechanism; an inverter circuit, for converting a commercial frequency to a driving frequency, to control the motor; a noise filter, arranged at an input of the inverter circuit, for suppressing a common mode noise of the commercial power source and the inverter circuit, and connected to a ground through a metal frame used for receiving a compressor main body, wherein the noise filter further comprises first capacitors, second capacitors and common mode reactor coils; and a leakage current suppressing circuit, having a clamper for clamping a voltage, connected between nodes of the second capacitors and the metal frame; and a third capacitor, connected to the clamper in parallel. In the noise filter, one end of each second capacitor is connected to the AC power line through the corresponding common mode reactor coil, and the other end of the each second capacitor is connected to the leakage current suppressing circuit, and each of the first capacitors is connected between two of the AC power lines.

Moreover, the clamper in the leakage current suppressing circuit can be formed by opposite connected Zener diodes. In particularly, the Zener voltage of the Zener diode can be set within a range from 10V to 30V, and the capacitance of the third capacitor can be set within a range from 470 pF to 10000 pF.

BRIEF DESCRIPTION OF DRAWINGS

While the specification concludes claims particularly pointing out and distinctly claiming the subject matter which is regarded as the invention, the objects and features of the invention and further objects, features and advantages thereof will be better understood from the following description taken in connection with the accompanying drawings in which:

DETAILED DESCRIPTION

Figure 1:
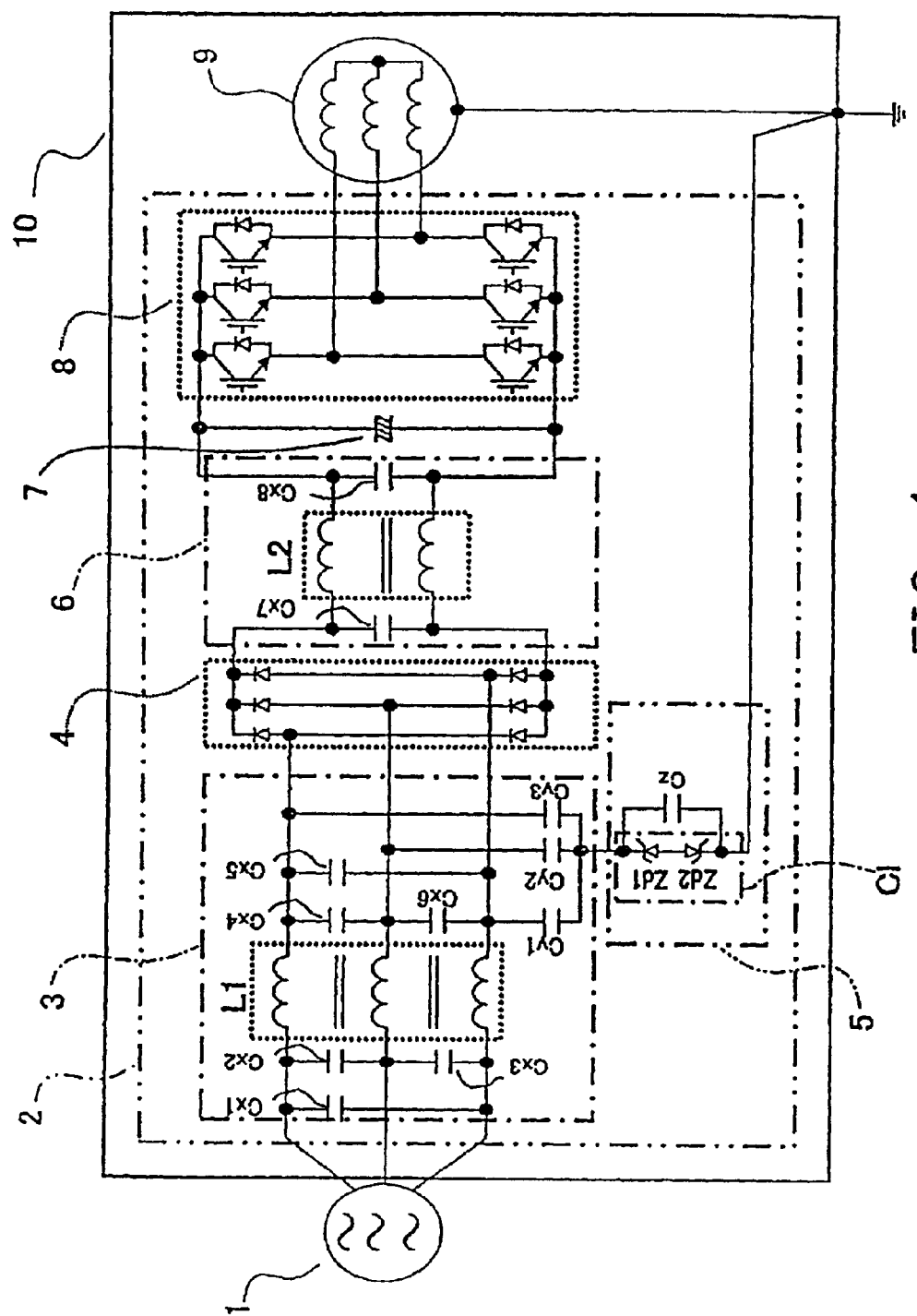
FIG. 1 is a circuit diagram of a controlling device of a compressor according to the invention, which compressor comprises a driving circuit having a leakage current suppressing circuit composed of a clamper and a third capacitor.
Figure 2:
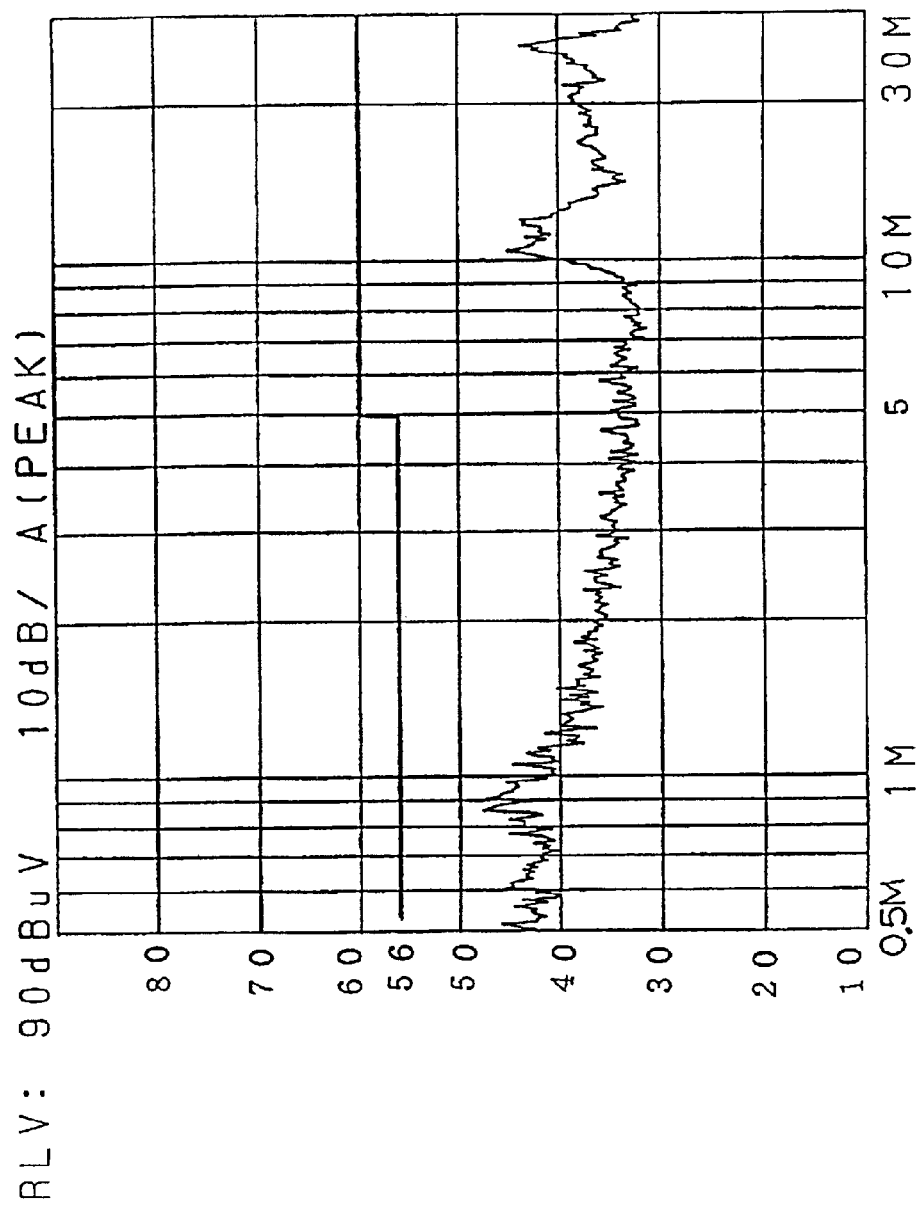
FIG. 2 is a characteristic curve of the circuit in FIG. 1, which shows a relationship between the frequency and the noise terminal voltage.
Figure 3:
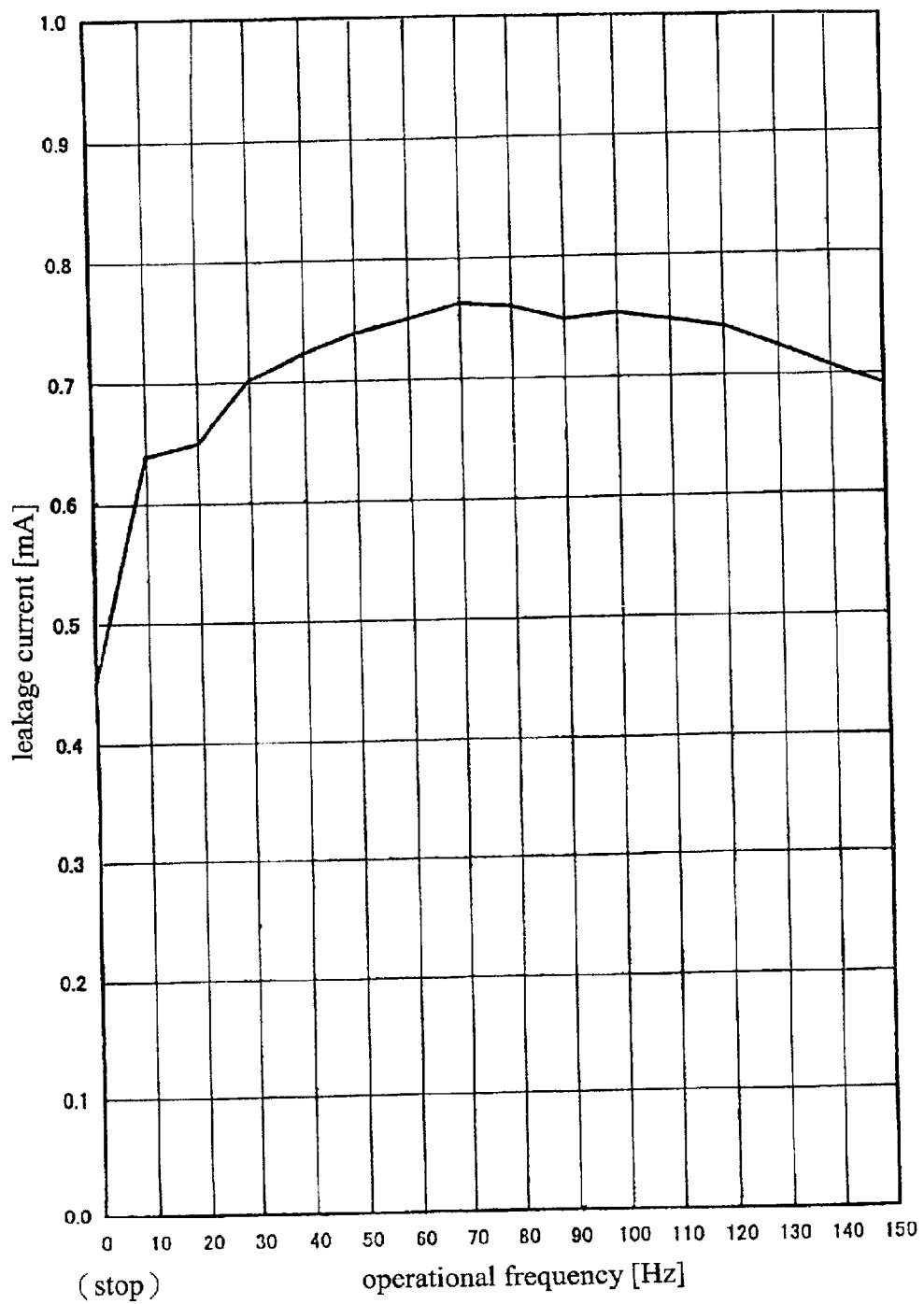
FIG. 3 is a characteristic diagram of the circuit in FIG. 1, which shows a relationship between the operational frequency and the leakage current.
Figure 4:
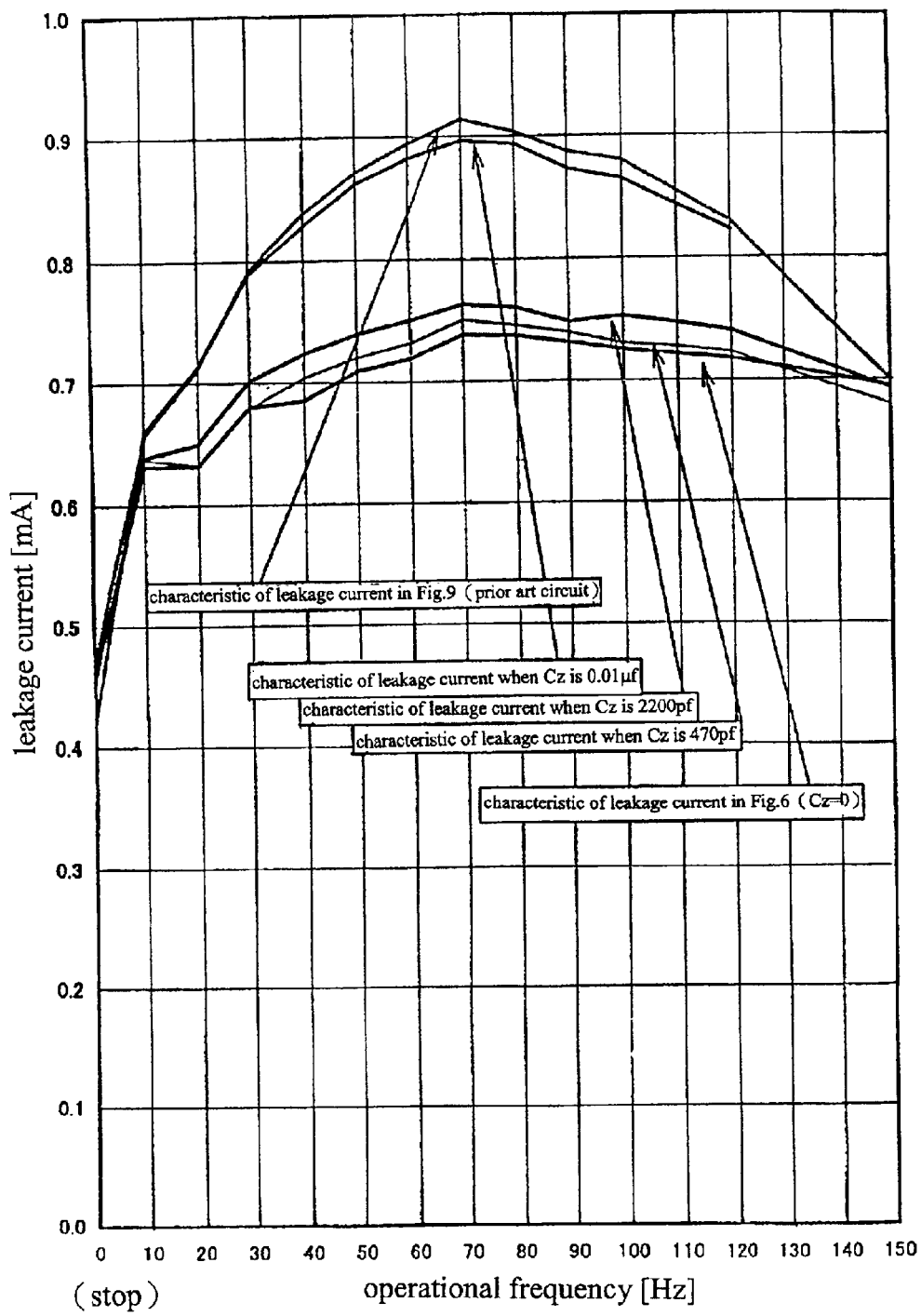
FIG. 4 shows measured values of the leakage current for various the capacitance of the third capacitor.
Figure 5:
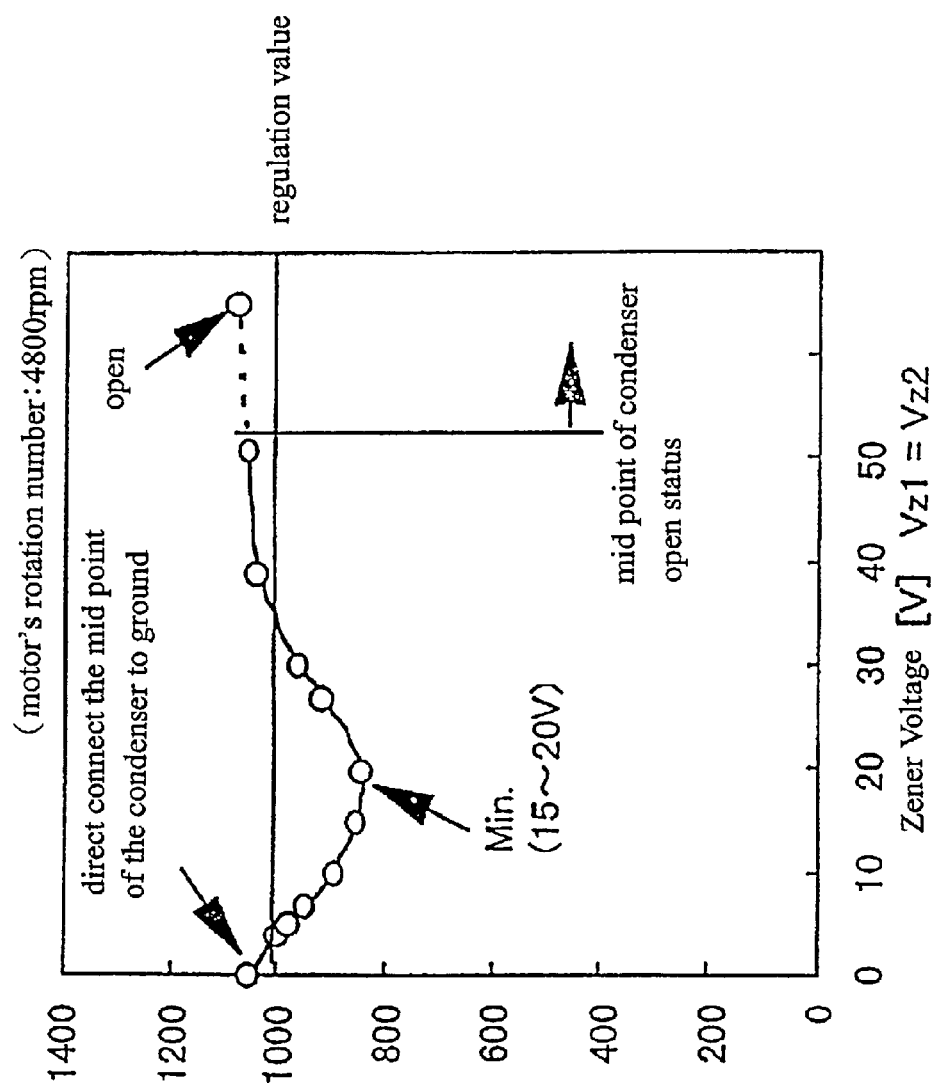
FIG. 5 shows measured values of the leakage current for variouszener voltage (clamp voltage)
Figure 6:
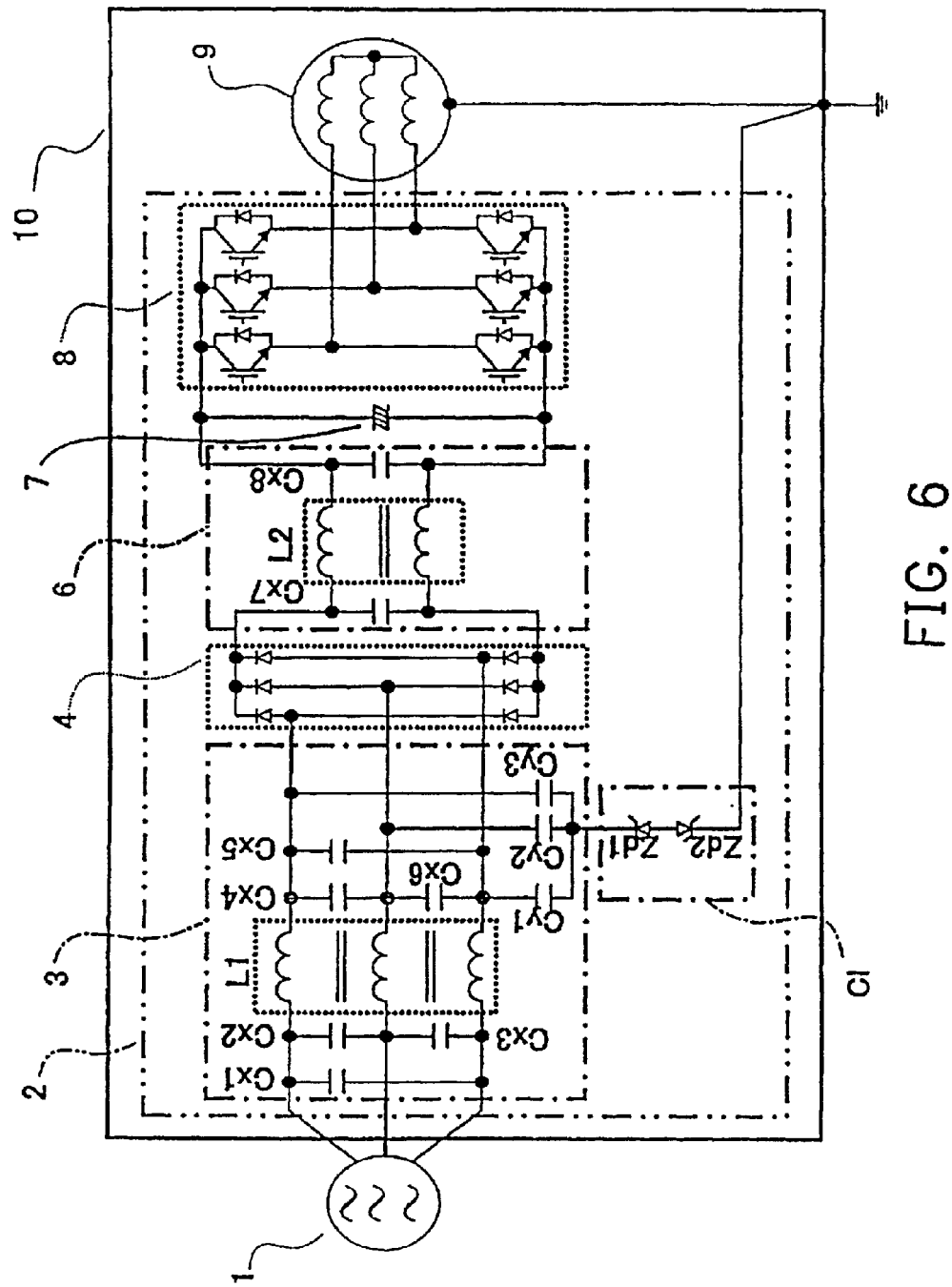
FIG. 6 is a circuit diagram of a controlling device of a compressor according to the invention, which compressor comprises a driving circuit having a leakage current suppressing circuit with a clamper.
Figure 7:
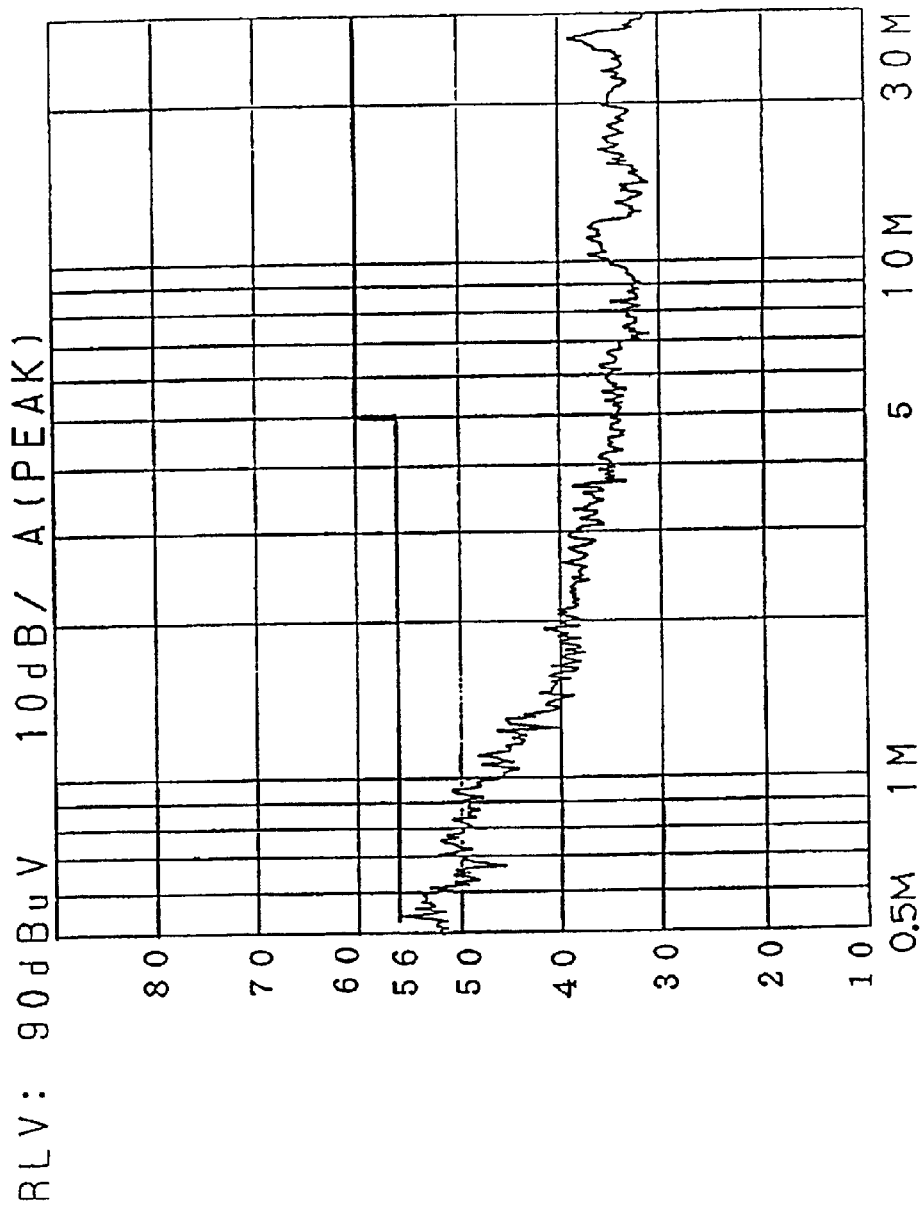
FIG. 7 is a characteristic curve of the circuit in FIG. 6, which shows a relationship between the frequency and the noise terminal voltage.
Figure 8:
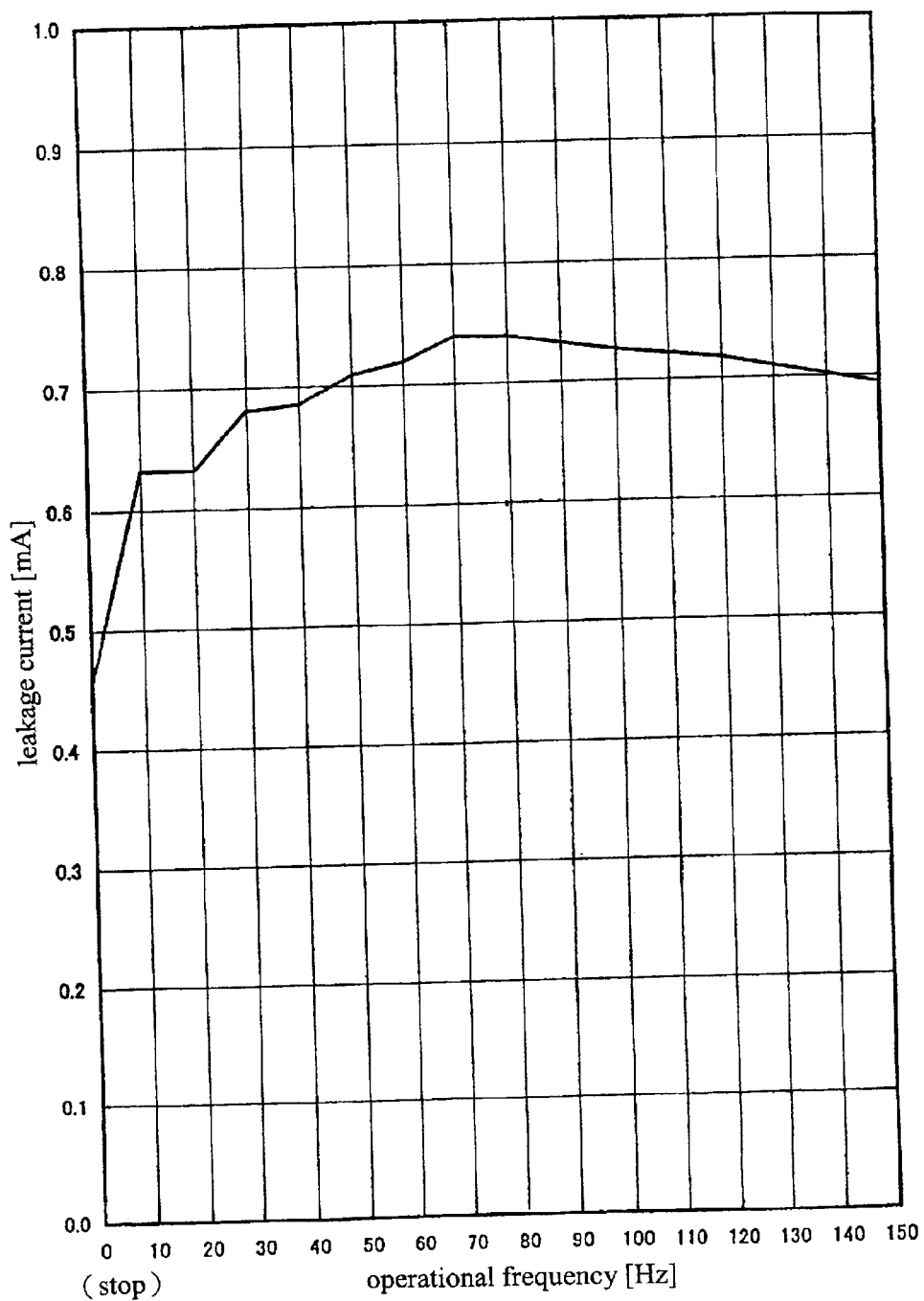
FIG. 8 is a characteristic curve of the circuit in FIG. 6, which shows a relationship between the operational frequency and the leakage current.

The invention is described in detail as follows, but all matters set forth herein or shown in the accompanying drawings are to be interpreted in an illustrative and non-limiting sense. The embodiment of the invention is described based on attached drawings of FIGS. 1~8. FIG. 1 is a circuit diagram of a controlling device of a compressor according to the invention, which comprises a driving circuit comprising a leakage current suppressing circuit including a clamper and a third capacitor. FIG. 2 is a characteristic curve of the circuit in FIG. 1, which shows a relationship between the frequency and the noise terminal voltage. FIG. 3 is a characteristic curve of the circuit in FIG. 1, which shows a relationship between the operational frequency and the leakage current. FIG. 4 shows measured values of the leakage current plotted against various capacitance of the third capacitor. FIG. 5 shows measured values of the leakage current plotted against various Zener voltage (clamp voltage). FIG. 6 is a circuit diagram of a controlling device of a compressor according to the invention, which compressor comprises a driving circuit having a leakage current suppressing circuit with a clamper. FIG. 7 is a characteristic curve of the circuit of FIG. 6, which shows a relationship between the frequency and the noise terminal voltage. FIG. 8 is a characteristic curve of the circuit in FIG. 6, which shows a relationship between the operational frequency and the leakage current. In addition, the elements having the same function as the prior art are labeled with the same number.

In FIG. 1, the compressor's controlling device comprises a three-phase AC power source 1, a driving circuit 2 for driving an inverter driven DC brushless motor, a compressor main body (i.e., a metal case) 9, and a metal frame 10 forming a main body of an air conditioner for receiving the condenser, the fan and various controlling circuits (not shown). Metal pipes (not shown) are fixed onto the compressor main body 9 by welding.

The driving circuit 2 comprises a main circuit comprising a first noise filter 3 for decreasing (suppressing) a noise created by the machine itself and the ground noise (the common mode noise) created between power lines and the metal frame 10 or the ground, a rectifying diode bridge 4 for rectifying the three-phase AC power source to a DC power source, a second noise filter 6, a rectifying capacitor 7 and a three-phase inverter circuit 8.

The rectifying diode bridge 4, the second noise filter 6 and the rectifier capacitor 7 smoothly convert an AC voltage to a DC voltage. In addition, the three-phase inverter circuit 8 switches the DC voltage from the rectifying capacitor 7 by a preset frequency (the switching frequency can be 5 kHz, for example), and then provides a driving power to the DC brushless motor.

The first noise filter 3 comprises six first condensers (X condensers) Cx1, Cx2, Cx3, Cx4, Cx5, Cx6 connected among lines of the three-phase power source 1, three second condensers (Y condensers) Cy1, Cy2, Cy3 respectively connected to the lines of the three-phase power source 1 in series, and three common mode reactor coils L1 connected between the first condensers and the second condensers.

The second noise filter 6 is a π-connection of two condensers (X condensers) Cx7, Cx8 between power source lines that forms DC power source through a rectifier diode bridge 4, and a coil L2. The second noise filter 6 functions to decrease noise that flows reversely from the three-phase inverter circuit 8 to the power source.

The compressor main body 9 and the metal frame 10 are respectively connected through a leakage current controlling circuit 5 (main feature of the invention) to a connection point among the second condensers Cy1, Cy2, Cy3 that are respectively connected in series, to the power source lines of the three-phase power source 1. In addition, in view of stable operation of the driving circuit 2 and the safety to prevent the human body from the electric shock because of the possibility of touching the frame 10, the compressor main body 9 and the metal frame 10 are grounded.

The leakage current controlling circuit 5 includes a clamper and a third condenser (Z condenser) Cz connected in parallel with the clamper C1, in which the clamper C1 is used for clamping a voltage and is installed between the metal frame 10 and a connection point between the second condensers Cy1, Cy2, between Cy2, Cy3, and between Cy3, Cy1. In particular, the clamper C1 consists of two Zener diodes Zd1, Zd2 that are connected opposite to each other.

According to the above structure, and based upon description in conjunction with FIGS. 2~5, various operations and variations of the noise terminal voltage by varying the operational frequency of the compressor's controlling device (particularly, the leakage current controlling circuit 5), variations of the leakage current by varying the frequency of the power source, and processes are simply described.

Figure 9:
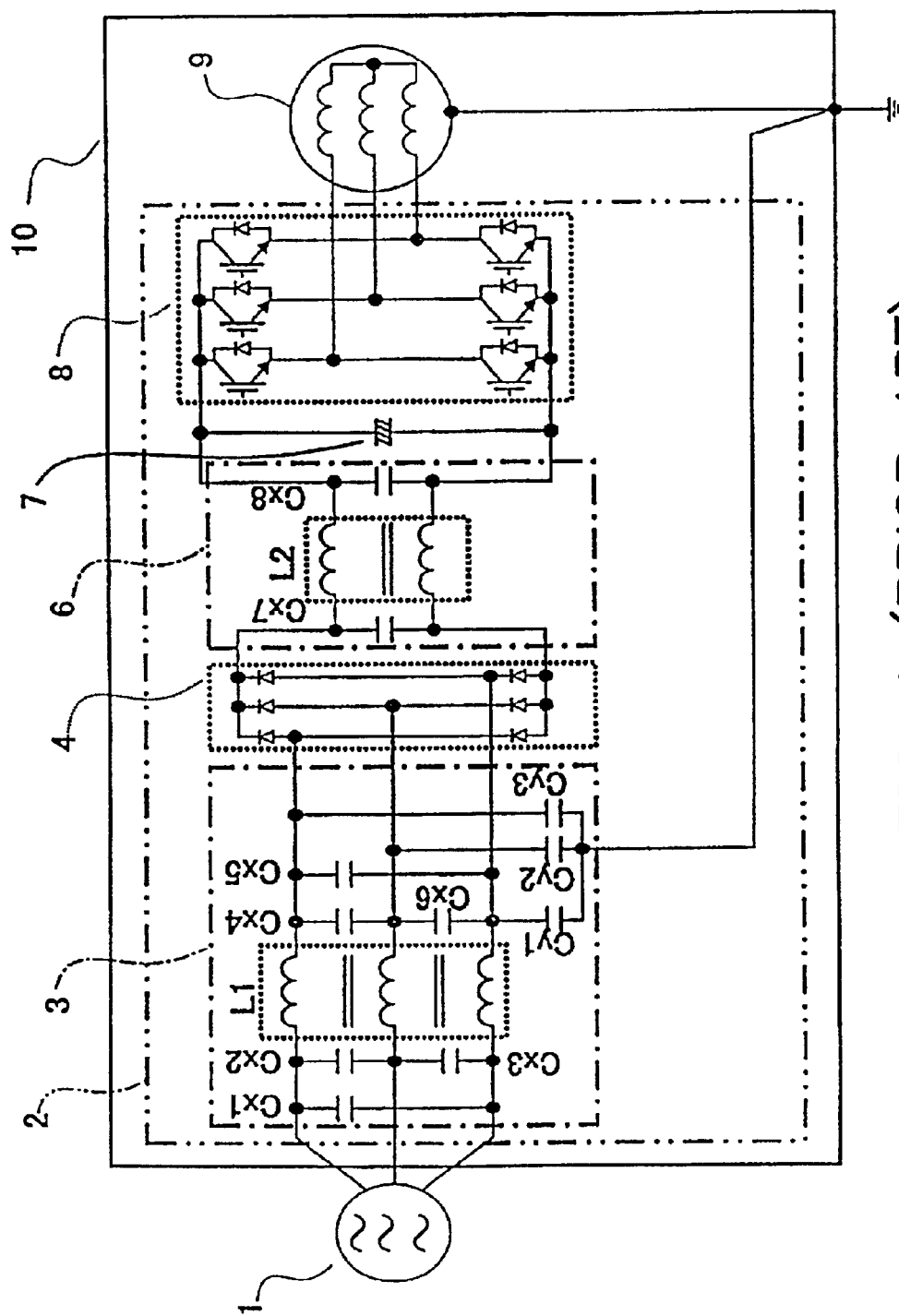
FIG. 9 shows a conventional example of a controlling device of a compressor having a driving circuit to drive an inverter driven DC brushless motor.
Figure 10:
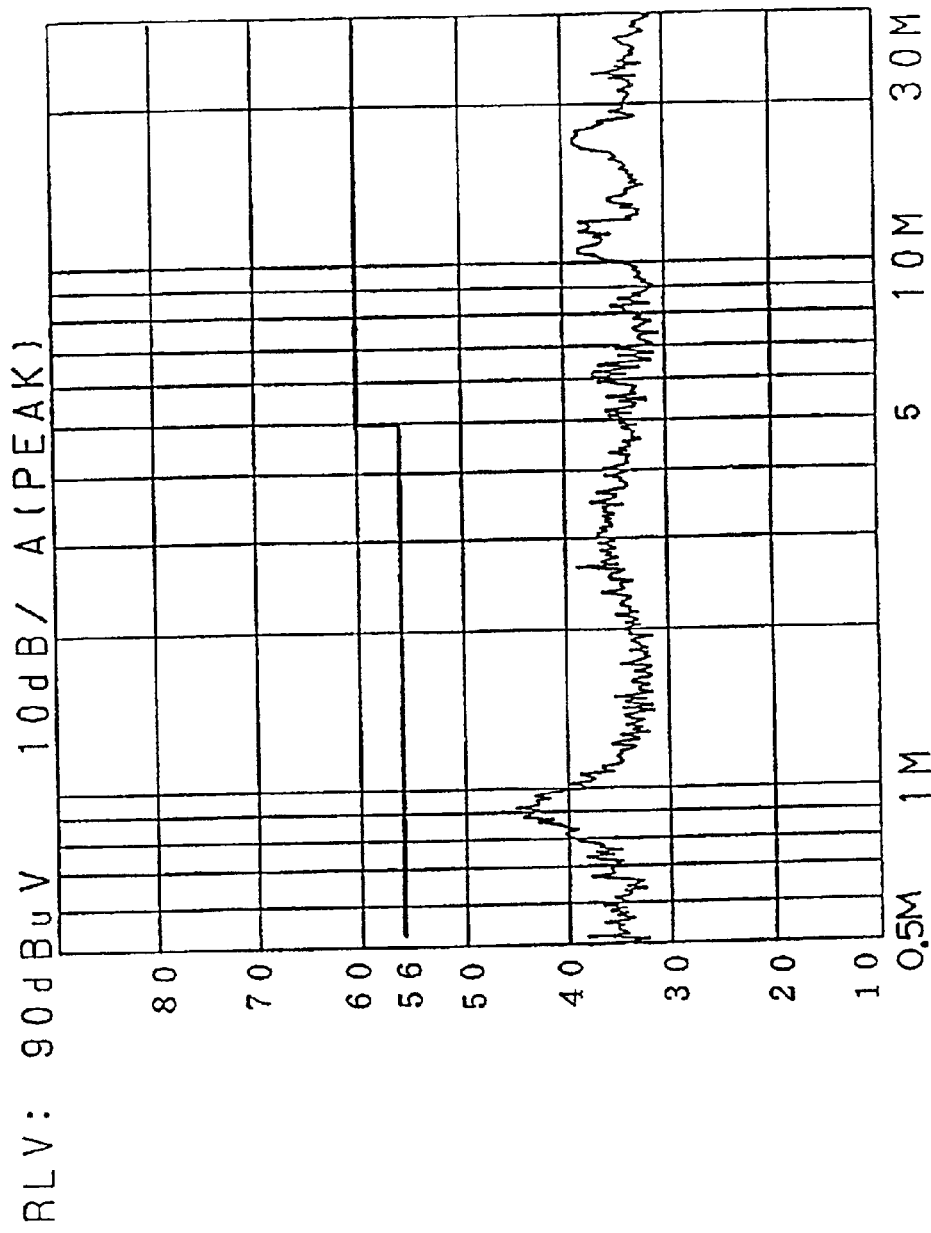
FIG. 10 is a characteristic curve of the conventional circuit in FIG. 9, which shows a relationship between the frequency and the noise terminal voltage.

First, the characteristics of the noise terminal voltage (voltage suppression) is described herein as follows. As comparing with the characteristics of the noise terminal voltage (FIG. 2) corresponding to the circuit in FIG. 1 showing the first embodiment of the controlling of the invention, the characteristics of the noise terminal voltage (FIG. 7) corresponding to the circuit in FIG. 6 showing the second embodiment, and the characteristics of the noise terminal voltage (FIG. 10) corresponding to the conventional circuit in FIG. 9, the differences among them are very clear. In FIGS. 2, 7 and 10, the vertical axis indicates the noise terminal voltage (10 dBuV~90 dBuV) and the horizontal axis indicates the frequency (0.5 MHz~30 MHz). In addition, the value indicated within the bold rectangle shows a legal regulated value (below 56 dB at a range less or equal to 5 MHz, below 30 dB between 5 MHz and 30 MHz). Furthermore, from the voltage range and the capacitance range, the measured clamping voltage (precisely, the Zener voltage,) of the clamper (the Zener diode) is 15V and the measured capacitance of the third condenser Cz is 2200 pF.

The major differences of the above characteristic curves are at the range of 0.5 MHz~4 MHz (range A) and at the range of 10 MHz~30 MHz (range B). Referring to range A, the conventional example has the lowest noise terminal voltage, next is the first embodiment, and the noise terminal voltage of the second embodiment is the highest one. At the range B, the second embodiment has the lowest noise terminal voltage, followed by the conventional example, and the noise terminal voltage of the first embodiment is the highest one. At the range B, any circuit would have a sufficient margin to clear the legal regulation value (60 dB). However, at the range A, inserting the third capacitor in parallel with the clamper will make it worse than the conventional example in that no clamper is inserted, but still there exist a margin to clear the legal regulation value (56 dB). For example, the noise terminal voltage can be effectively suppressed by coupling the clamper C1 in parallel with the third capacitor (Z capacitor) Cz.

Figure 11:
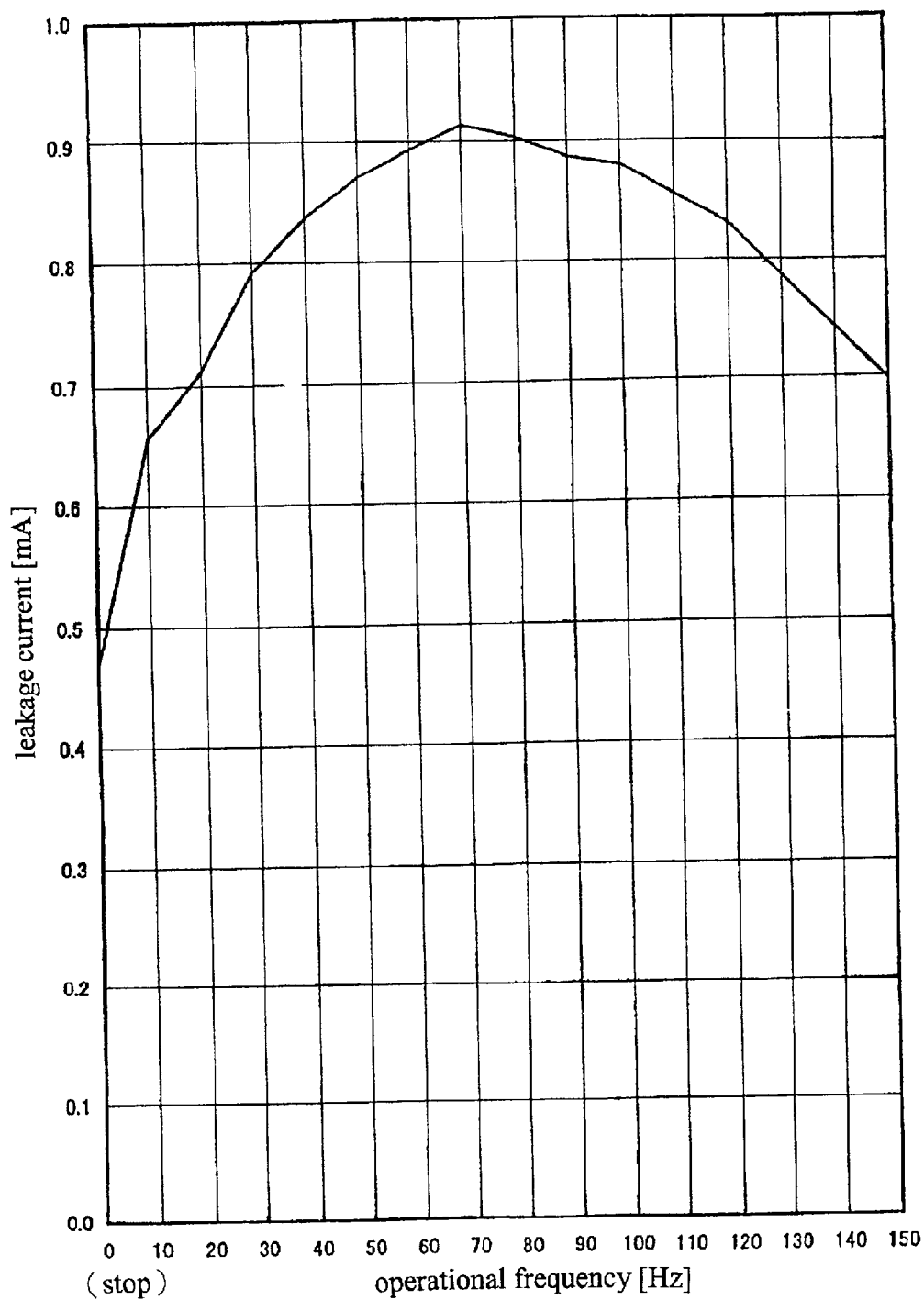
FIG. 11 is a characteristic curve of the conventional circuit of FIG. 9, which shows a relationship between the operational frequency and the leakage current.

Following is a detailed description with regard to suppression of the leakage current according to the present invention. Similar to the characteristics of the noise terminal voltage, the characteristics of the leakage current corresponding to the first embodiment (FIG. 3), the leakage current corresponding to the second embodiment (FIG. 8), and the leakage current corresponding to the conventional example (FIG. 11), and also the differences among them are also very clear. Referring to FIG. 4, the characteristic curves for leakage current corresponding to above embodiments are shown, and their differences are also more clear seen from the graph. Namely, in FIGS. 3, 4, 8 and 11, the vertical axis indicates the leakage current (ranges from 0 mA to 1.0 mA and the legal regulation value is under 1 mA) and the horizontal axis indicates the operational frequency (ranging from 0 Hz to 150 Hz). As can be clearly seen, the leakage current of the second embodiment is smallest (i.e., Cz=0), followed by the first embodiment (especially, in FIG. 4, Cz value smaller the better), and the leakage current of the conventional example is the highest.

Referring to FIG. 4, any one of the current curves is centered on an operational frequency of 70 Hz (the maximum) to form an upward curve. At a range where the AC power frequency is from 50 Hz to 60 Hz, there exists a margin above 1 percent to clear the regulation value. In particular, when the capacitance of the third condenser (the Z condenser) Cz is set to be equal or less than 2200 pF, there exists a margin above 25% to clear the regulation value. A better effect can be achieved when the capacitance of the third condenser (the Z condenser) Cz is less than or equal to 10000 pF (the leakage current is lower than the situation where no leakage current suppressing circuit 5 is included), and is greater than or equal to a certain value (470 pF in the embodiment) larger than Cz=0.

In order to suppress the increase of noise terminal voltage, the larger the capacitance of the third condenser (the Z condenser) Cz, the better the effect is. For suppressing (decreasing) the leakage current, a smaller capacitance for the third condenser (the Z condenser) Cz is better.

Furthermore, referring to FIG. 4, as can be clearly seen that when Cz=0, Cz=470 pF, and Cz=2200 pF, there is no obvious difference between the above current characteristics (only about 0.03 mA). Therefore, by measuring each characteristic of the noise terminal voltage and the leakage current, it can be well correlated that when the capacitance (4700 pF) of the Y capacitors Cy1, Cy2, Cy3 in the first noise filter3 is considered, the Z capacitor having about the same or near capacitance (2200 pF) is desirable.

FIG. 5 shows measured values of the leakage current plotted against the clamping voltage (the Zener voltage, in detail) of the clamper (the Zener diodes, in detail). The vertical axis indicates the voltage value, which can be converted to a current value (in a measuring circuit with a resistance of 1 kΩ) for measuring the leakage current (this is the voltage converting value, and the legal regulation value is under 1000 mV within a range of 0 mV~1400 mV). The horizontal axis indicates the Zener voltage (range from 0V~70V). The voltage curve is centered on a voltage of 17V (minimum) to form a downward curve. In consideration of the above plots, it is clear that if the Zener voltage is set in a range of 5V~30V, the regulation value of the leakage current can be cleared with a value lower than about 10%. In the embodiment of the present invention, the Zener voltage of each Zener diode is set at 15V.

As described above, to vary the Zener voltage has the following meanings. Namely, the measured values in FIG. 5 shows the effect of varying Zener voltage and the effect of varying the coupling capacitance are the same. In other words, by changing the Zener voltage, the function of the first noise filter 3 can be maintained, and the current flowing from the noise filter 3 to the metal frame 10 can be suppressed. In addition, by changing the coupling capacitance, the phases of the two currents flowing into the metal frame 10 can be changed. As a result, the leakage current can be suppressed to a minimum value.

In the actual controlling device of the compressor, to select the coupling capacitance of the Zener diodes Zd1, Zd2 is not the only way to suppress the leakage current, the phase of current flowing into the metal frame 10 may have a substantially an opposite phase. A phase adjusting circuit may be additionally arranged to have an opposite phase at the ground line. Of course, an optimized configuration would take the characteristic values of the constitution parts, such as the capacitances of the Y capacitors Cy1, Cy2, Cy3 and the inductance of the common mode reactor coil L1 in the first noise filter 3 shown in FIG. 1, into consideration, to have a phase substantially opposite to that of the current flowing into the metal frame 10. Particularly, in the embodiment of the present invention, because the Y capacitors Cy1, Cy2, Cy3 and the common mode reactor coil L1 have a function of the phase adjusting circuit, and therefore, advantageously, no independent circuit is required.

The current flowing through the leakage current suppressing circuit 5 and the current flowing through the compressor main body 9 due to the floating capacitance are merged at the metal frame 10. The merged current, which constitutes a leakage current of the controlling device, flows to the ground. If the phases of the currents are opposite phases, the currents will interfere with each other, so that the leakage current can be reduced. The latter current is changed according to the refrigerant type, and its phase is substantially a constant due to the switching period of the inverter circuit 8. If the phase is opposite to that of the previous one, the leakage current can be reduced.

According to the above embodiment of the present invention, the noise filter for suppressing the common mode noise of the commercial power source and the inverter circuit is connected to the ground through the metal frame used for receiving a compressor main body. The noise filter further comprises first capacitors, connected between AC power lines; second capacitors, connected among the AC power lines in series; and common mode reactor coils, connected among the first capacitors and the second capacitors. The leakage current suppressing circuit has a clamper for clamping a voltage, and connected between nodes of the second capacitors and the metal frame. Therefore, the leakage current, which is caused by the floating capacitance generated between the power lines and the main body and through the refrigerant in the compressor main body, can be reduced by the phase adjustment of the clamper, so that the leakage current can be maintained to meet the regulation requirement (under 1 mA).

According to the above embodiment, the noise filter for suppressing the common mode noise of the commercial power source and the inverter circuit is connected to the ground through the metal frame used for receiving a compressor main body. The noise filter further comprises first capacitors, second capacitors, and common mode reactor coils. The leakage current suppressing circuit has a clamper for clamping a voltage, connected between nodes of the second capacitors and the metal frame; and a third capacitor, connected to the clamper in parallel. In the noise filter, one end of each second capacitor is connected to the AC power line through the corresponding common mode reactor coil, and the other end of the each second capacitor is connected to the leakage current suppressing circuit, and each of the first capacitors is connected between two of the AC power lines. Therefore, the leakage current, which is caused by the floating capacitance generated between the power lines and the main body through the refrigerant in the compressor main body, can be reduced through the phase adjustment of the clamper. Additionally, the increase of the noise terminal voltage due to the existence of the clamper can also be suppressed. The legal regulation requirements of both the leakage current and the noise terminal voltage can be met.

The clamper in the leakage current suppressing circuit is formed by opposite connected Zener diodes. Therefore, the leakage current resulting from the voltage lower than the Zener voltage will not flow from the noise filter to the frame. At least, the leakage current due to the voltage lower than the Zener voltage can be cut off, so that the leakage current can be effectively reduced.

The Zener voltage of the Zener diode is set within a range from 10V to 30V. Therefore, the leakage current can be effectively reduced. In particular, even though the three-phase AC power source is used as the power source, the leakage current can be suppressed to a value which is under the regulation value.

Furthermore, the capacitance of the third capacitor is set within a range from 470 pF to 10000 pF. In this way, the increase of the noise terminal voltage due to the clamper (Zener diodes) can be suppressed, and additionally, the leakage current can be effectively cut. Therefore, both the leakage current and the noise terminal voltage can have sufficient margins to clear their legal regulation requirements.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A controlling device of a compressor, comprising:
   a commercial power source;
   a motor, for driving a compressor mechanism;
   an inverter circuit, for converting a commercial frequency to a driving frequency, to control the motor;
   a noise filter, arranged at an input of the inverter circuit, for suppressing a common mode noise of the commercial power source and the inverter circuit, and connected to a ground through a metal frame used for receiving a compressor main body, wherein the noise filter further comprises first capacitors, second capacitors and common mode reactor coils; and
   a leakage current suppressing circuit, having a clamper for clamping a voltage, and connected between nodes of the second capacitors and the metal frame,
   wherein in the noise filter, one end of each second capacitor is connected to an AC power line through a corresponding common mode reactor coil, and the other end of the each second capacitor is connected to the leakage current suppressing circuit, and each of the first capacitors is connected between two of the AC power lines.

2. The controlling device of claim 1, wherein the clamper in the leakage current suppressing circuit is formed by opposite connected Zener diodes.

3. The controlling device of claim 2, wherein a Zener voltage of the Zener diode is set within a range from 10V to 30V.

4. A controlling device of a compressor, comprising:
   a commercial power source;
   a motor, for driving a compressor mechanism;
   an inverter circuit, for converting a commercial frequency to a driving frequency, to control the motor;
   a noise filter, arranged at an input of the inverter circuit, for suppressing a common mode noise of the commercial power source and the inverter circuit, and connected to a ground through a metal frame used for receiving a compressor main body, wherein the noise filter further comprises first capacitors, second capacitors and common mode reactor coils; and
   a leakage current suppressing circuit, having a clamper for clamping a voltage, connected between nodes of the second capacitors and the metal frame; and a third capacitor, connected to the clamper in parallel,
   wherein in the noise filter, one end of each second capacitor is connected to an AC power line through a corresponding common mode reactor coil, and the other end of the each second capacitor is connected to the leakage current suppressing circuit, and each of the first capacitors is connected between two of the AC power lines.

5. The controlling device of claim 4, wherein the clamper in the leakage current suppressing circuit is formed by opposite connected Zener diodes.

6. The controlling device of claim 5, wherein a Zener voltage of the Zener diode is set within a range from 10V to 30V.

7. The controlling device of claim 4, wherein the capacitance of the third capacitor is set within a range from 470 pF to 10000 pF.

* * * * *